(12) United States Patent
Nakagawa et al.

(10) Patent No.: US 8,459,805 B2
(45) Date of Patent: Jun. 11, 2013

(54) DISPLAY APPARATUS

(75) Inventors: Tomohiro Nakagawa, Tokyo (JP);
Tsutomu Katou, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 505 days.

(21) Appl. No.: 12/452,589

(22) PCT Filed: Jul. 17, 2008

(86) PCT No.: PCT/JP2008/063326
§ 371 (c)(1),
(2), (4) Date: Jan. 11, 2010

(87) PCT Pub. No.: WO2009/014192
PCT Pub. Date: Jan. 29, 2009

(65) Prior Publication Data
US 2010/0128185 A1 May 27, 2010

(30) Foreign Application Priority Data

Jul. 25, 2007 (JP) ................................. 2007-193279

(51) Int. Cl.
*G03B 21/00* (2006.01)
(52) U.S. Cl.
USPC ................. 353/122; 353/30; 353/71; 353/94; 345/204; 345/650; 348/556
(58) Field of Classification Search
USPC ...... 353/69, 30, 70, 94, 71, 31, 122; 349/5–9, 349/345, 348, 715; 345/204, 419, 619, 649, 345/650; 348/556, 558, 555, 231.99, 744, 348/745
See application file for complete search history.

(56) References Cited

U.S. PATENT DOCUMENTS

| 7,072,003 | B2 * | 7/2006 | Stahl et al. ........................ 349/5 |
| 7,106,383 | B2 | 9/2006 | Kahn |
| 7,131,730 | B2 * | 11/2006 | Koide ............................. 353/20 |
| 7,176,980 | B2 * | 2/2007 | Stone et al. .................... 348/558 |
| 7,598,948 | B1 * | 10/2009 | Priem ............................ 345/204 |
| 7,802,288 | B2 * | 9/2010 | Sie et al. ....................... 725/116 |

(Continued)

FOREIGN PATENT DOCUMENTS

| JP | 2002-196736 | 7/2002 |
| JP | 2003-348496 | 12/2003 |

(Continued)

OTHER PUBLICATIONS

Japanese Office Action dated Aug. 31, 2011, with partial English translation.

(Continued)

*Primary Examiner* — Georgia Y Epps
*Assistant Examiner* — Sultan Chowdhury
(74) *Attorney, Agent, or Firm* — McGinn IP Law Group, PLLC

(57) ABSTRACT

A display apparatus is capable of displaying a distortion-free projected image based on an image signal from a computer. The display apparatus receives an image signal from the computer and projects an image depending on the image signal onto a projection surface. The display apparatus includes a setting section which sets identification information representative of an aspect ratio of a display of the computer. The identification information set in the setting section can be changed by the user.

14 Claims, 3 Drawing Sheets

U.S. PATENT DOCUMENTS

| | | | |
|---|---|---|---|
| 7,884,836 B2* | 2/2011 | Hussain | 345/649 |
| 7,904,632 B2* | 3/2011 | Sakasegawa | 710/316 |
| 7,999,816 B2 | 8/2011 | Onuma et al. | |
| 2005/0001931 A1* | 1/2005 | Kahn | 348/556 |
| 2005/0212965 A1* | 9/2005 | Stone et al. | 348/558 |
| 2006/0017751 A1 | 1/2006 | Shintani et al. | |
| 2006/0176397 A1* | 8/2006 | Panabaker | 348/556 |
| 2006/0238648 A1* | 10/2006 | Wogsberg | 348/441 |
| 2007/0035707 A1* | 2/2007 | Margulis | 353/122 |
| 2007/0050294 A1* | 3/2007 | Trottier et al. | 705/50 |

FOREIGN PATENT DOCUMENTS

| | | |
|---|---|---|
| JP | 2004-102067 A | 4/2004 |
| JP | 2004-102067 (A) | 4/2004 |
| JP | 2005-6311 (A) | 1/2005 |
| JP | 2005-141151 A | 6/2005 |
| JP | 2006-119399 | 5/2006 |
| JP | 2007-11035 | 1/2007 |

OTHER PUBLICATIONS

Japanese Office Action dated Jan. 31, 2012 (with an English translation).

* cited by examiner

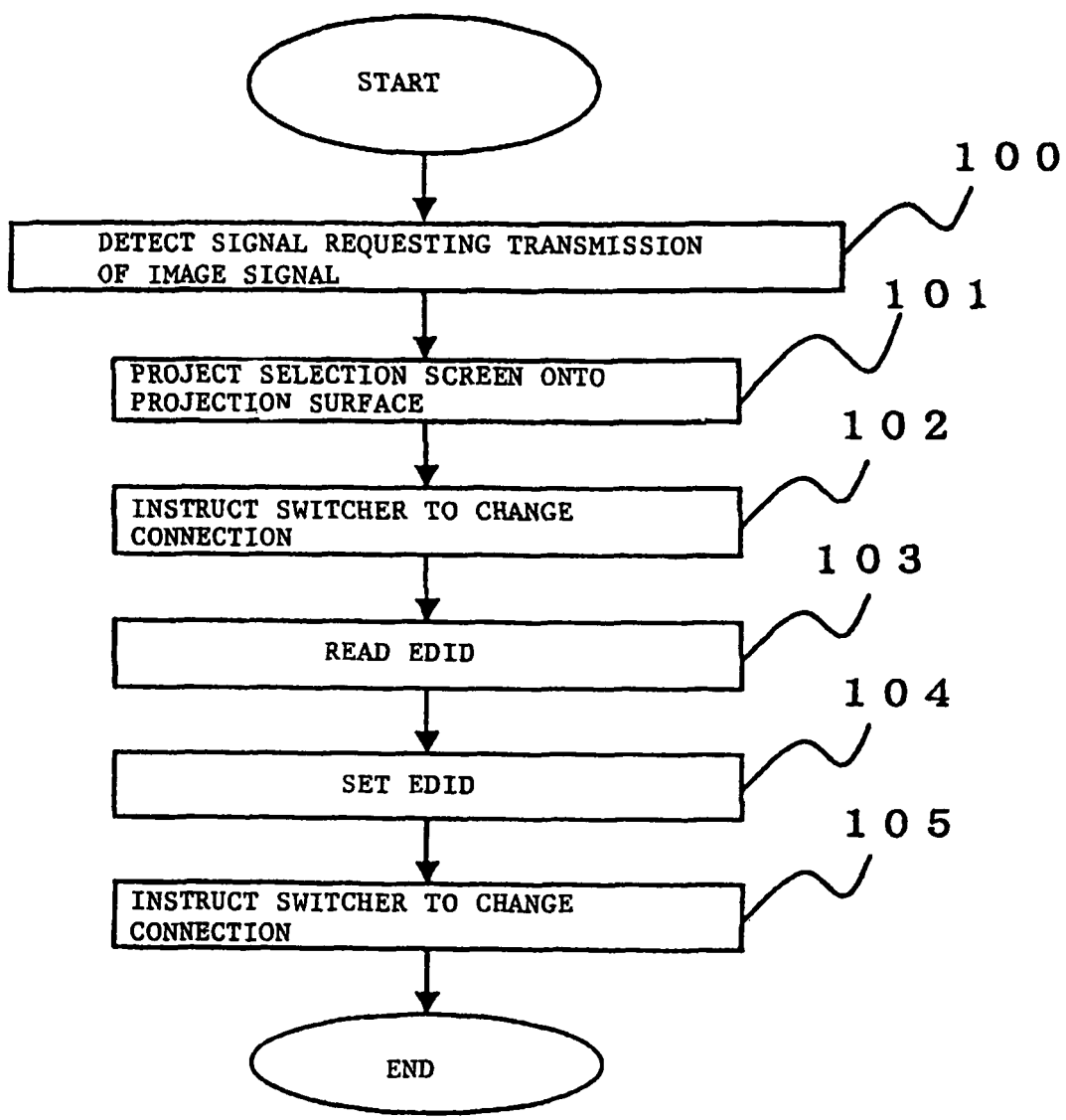

DISPLAY APPARATUS

BACKGROUND OF THE INVENTION

1. Field of the Invention

The present invention relates to a display apparatus for projecting an image.

2. Description of the Related Art

Projectors receive an image signal from a personal computer and project an image depending on the image signal onto a screen. The image projected from the projector onto the screen generally has an aspect ratio of 4:3. The aspect ratio refers to the ratio of the horizontal size to vertical size of the image.

Some personal computers (hereinafter referred to as an "ordinary PC") have a display aspect ratio of 4:3 and others (hereinafter referred to as "wide PC") have a display aspect ratio of 16:9, 16:10, or 15:9. These computers employ image signals corresponding to the aspect ratios of their displays.

When a projector having an aspect ratio of 4:3 receives an image signal from an ordinary PC having a display aspect ratio of 4:3, the projector projects a distortion-free image that is identical to the image displayed on the display screen of the ordinary PC.

However, when a projector having an aspect ratio of 4:3 receives an image signal from a wide PC having a display aspect ratio of 16:9, the projector projects an image at the aspect ratio of 4:3 though the image should be displayed at the aspect ratio of 16:9. Therefore, the image projected from the projector onto the screen is distorted, i.e., it is compressed horizontally and expanded vertically, and is not easily viewable.

JP-A No. 2003-348496 (hereinafter referred to as "Patent Document 1") discloses a projector for making screen-projected images easily viewable. Specifically, the projector disclosed in Patent Document 1 identifies the aspect ratio of an image frame based on the image signal sent from a PC. If the image from the PC is a high-definition image, then the projector identifies the aspect ratio of the image as 16:9. If the image from the PC is an ordinary image, then the projector identifies the aspect ratio of the image as 4:3. The projector projects the image at the identified aspect ratio onto the screen.

The projector disclosed in Patent Document 1 thus identifies the aspect ratio based on the image signal. However, it is difficult for the projector to properly identify the aspect ratios of image signals which are similar to each other, e.g., the aspect ratios of 15:9, 16:9, and 16:10. If the projector fails to identify the aspect ratio of an image, then it cannot project the image at its own aspect ratio, but projects an image that is not easily viewable.

SUMMARY OF THE INVENTION

It is an exemplary purpose of the present invention to provide a display apparatus which will solve the above and other problems and which can project distortion-free images.

To achieve the above and other purposes, there is provided in accordance with the present invention a display apparatus for receiving an image signal from a computer and projecting an image depending on the image signal onto a projection surface, comprising:

a setting section which sets identification information representative of an aspect ratio of a display of the computer;

wherein the identification information set in the setting section is changeable by a user.

The above and other purposes, features, and advantages of the present invention will become apparent from the following description with reference to the accompanying drawings which illustrate examples of the present invention.

BRIEF DESCRIPTION OF THE DRAWINGS

FIG. 3 is a flowchart of an operation sequence of the projector shown in FIG. 2.

DETAILED DESCRIPTION OF THE EXEMPLARY EMBODIMENT

An exemplary embodiment of the present invention will be described in detail below with reference to the drawings.

Figure 1:
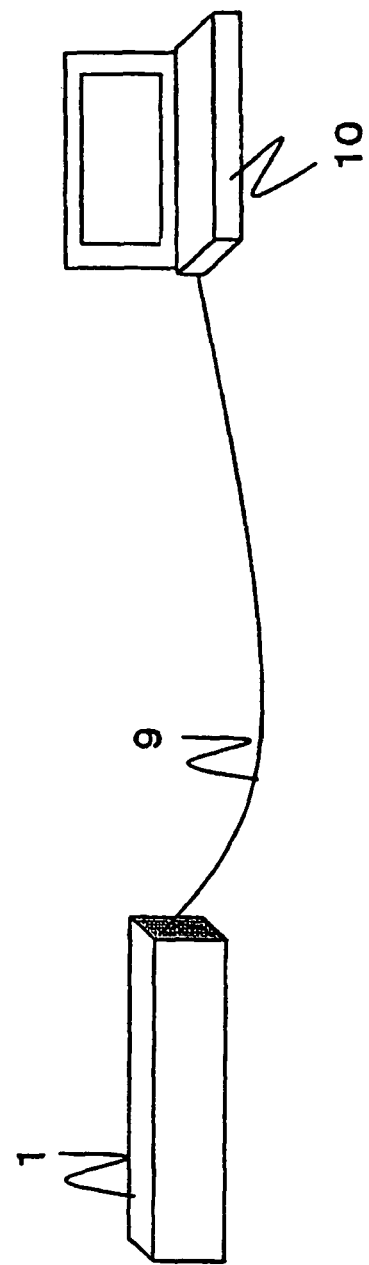
FIG. 1 is a view showing an arrangement of an image projection system incorporating a projector according to an exemplary embodiment of the present invention.

FIG. 1 shows an arrangement of an image projection system incorporating a projector according to an exemplary embodiment of the present invention. As shown in FIG. 1, the image projection system includes projector 1 and wide PC 10.

Projector 1 stores a plurality of EDID (Extended Display Identification Data) representing different aspect ratios, respectively. The user of projector 1 sets EDID representing the aspect ratio of the display of a computer.

Wide PC 10 can be connected to projector 1 through connection cable 9. When wide PC 10 is connected to projector 1 through connection cable 9, wide PC 10 acquires the EDID set in projector 1.

Wide PC 10 outputs an image signal having an aspect ratio indicated by the acquired EDID to projector 1. When projector 1 receives the image signal from wide PC 10, projector 1 projects an image depending on the image signal onto a projection surface.

Details of the arrangement of projector 1 will be described below with reference to FIG. 2. Projector 1 includes EDID storage 2, EDID setting section 3, switcher 4, projecting section 5, key input section 6, input/output section 7, and controller 8.

Controller 8 is connected to projecting section 5, key input section 6, and EDID storage 2. EDID setting section 3 is selectively connected to input/output section 7 and controller 8 by an I²C (Inter-Integrated Circuit) bus. The I²C bus employs two lines, i.e., a serial data line (SDA) and a serial clock line (SCL).

EDID storage 2 stores a plurality of EDID. The EDID refer to data in a format according to VESA (Video Electronics Standards Association), including information about display types and display performances. For example, EDID storage 2 stores EDID representing an aspect ratio of 4:3 (hereinafter referred to as 4:3 EDID), EDID representing an aspect ratio of 16:9 (hereinafter referred to as 16:9 EDID), EDID representing an aspect ratio of 16:10 (hereinafter referred to as 16:10 EDID), and EDID representing an aspect ratio of 15:9 (hereinafter referred to as 15:9 EDID).

Initially, EDID setting section 3 has the 4:3 EDID, for example, set therein as initial data. Thereafter, the user of projector 1 sets a desired one of the plural EDID stored in EDID storage 2.

Switcher 4 connects EDID setting section 3 to either input/output section 7 or controller 8 according to an instruction from controller 8. EDID setting section 3 is normally connected to input/output section 7 through switcher 4.

Projecting section 5 projects an image depending on an image signal from controller 8 onto the projection surface. The projection surface may include a screen or a wall. When controller 8 sends an image signal generated by wide PC 10 to projecting section 5, projection section 5 projects an image having an aspect ratio depending on the image signal onto the projection surface.

When wide PC 10 is connected to input/output section 7 by connection cable 9, wide PC 10 operates in a "plug-and-play" manner. Plug-and-play is a feature of wide PC 10 in which when projector 1 and wide PC 10 are connected to each other, the OS (Operating System) of wide PC 10 automatically detects projector 1 and makes optimum settings without the user's manual intervention. Plug-and-play is based on requirement specifications defined by Microsoft (registered trademark) Corporation. Interface standards of plug-and-play include USB (Universal Serial Bus) and IEEE 1394 (Institute of Electrical and Electronic Engineers 1394). Control data are exchanged between wide PC 10 and projector 1 for plug-and-play according to these standards.

When input/output section 7 is connected to wide PC 10 by connection cable 9, wide PC 10 acquires the EDID set in EDID setting section 3 in a plug-and-play session. Wide PC 10 is a computer having a function to read the EDID set in EDID setting section 3 in a plug-and-play session. When input/output section 7 is connected to wide PC 10, therefore, the EDID set in EDID setting section 3 are supplied through input/output section 7 to wide PC 10.

Key input section 6 has buttons including a selection button (not shown) for displaying a screen for selecting an aspect ratio of an image. When the selection button is pressed by the user, key input section 6 supplies controller 8 with a selection screen display request signal for sending an image signal representing a selection screen.

In response to the selection screen display request signal, controller 8 acquires data representative of the selection screen from a memory (not shown), generates an image signal representative of the selection screen based on the acquired data, and sends the generated image signal to projecting section 5. The selection screen includes contents (items) for the user to select an aspect ratio, and is displayed on the projection screen by projecting section 5. For example, the selection screen displays selection items indicative of the aspect ratios of "4:3", "16:9", "16:10", and "15:9" or others as appropriate.

After the selection screen is displayed, when the user presses a decision button (not shown) of key input section 6 for indicating the aspect ratio of an image to be projected, key input section 6 outputs a signal indicative of the aspect ratio (aspect ratio indicating signal) to controller 8.

When controller 8 receives the aspect ratio indicating signal from key input section 6, controller 8 instructs switcher 4 to change the connection of EDID setting section 3 from input/output section 7 to controller 8. Controller 8 then reads the EDID which has the aspect ratio indicated by the aspect ratio indicating signal received from key input section 6, from EDID storage 2, and sets the read EDID in EDID setting unit 3. When the setting of the EDID is finished, controller 8 instructs switcher 4 to change the connection of EDID setting section 3 from controller 8 to input/output section 7. In this manner, the EDID setting can be changed easily.

Controller 8 and input/output section 7 are connected to each other by an ordinary route (not shown) separate from the I²C bus. Controller 8 receives an image signal supplied from wide PC 10 to input/output section 7 through the ordinary route, and sends the received image signal to projecting section 5. Projecting section 5 displays an image based on the image signal sent from controller 8.

Figure 2:
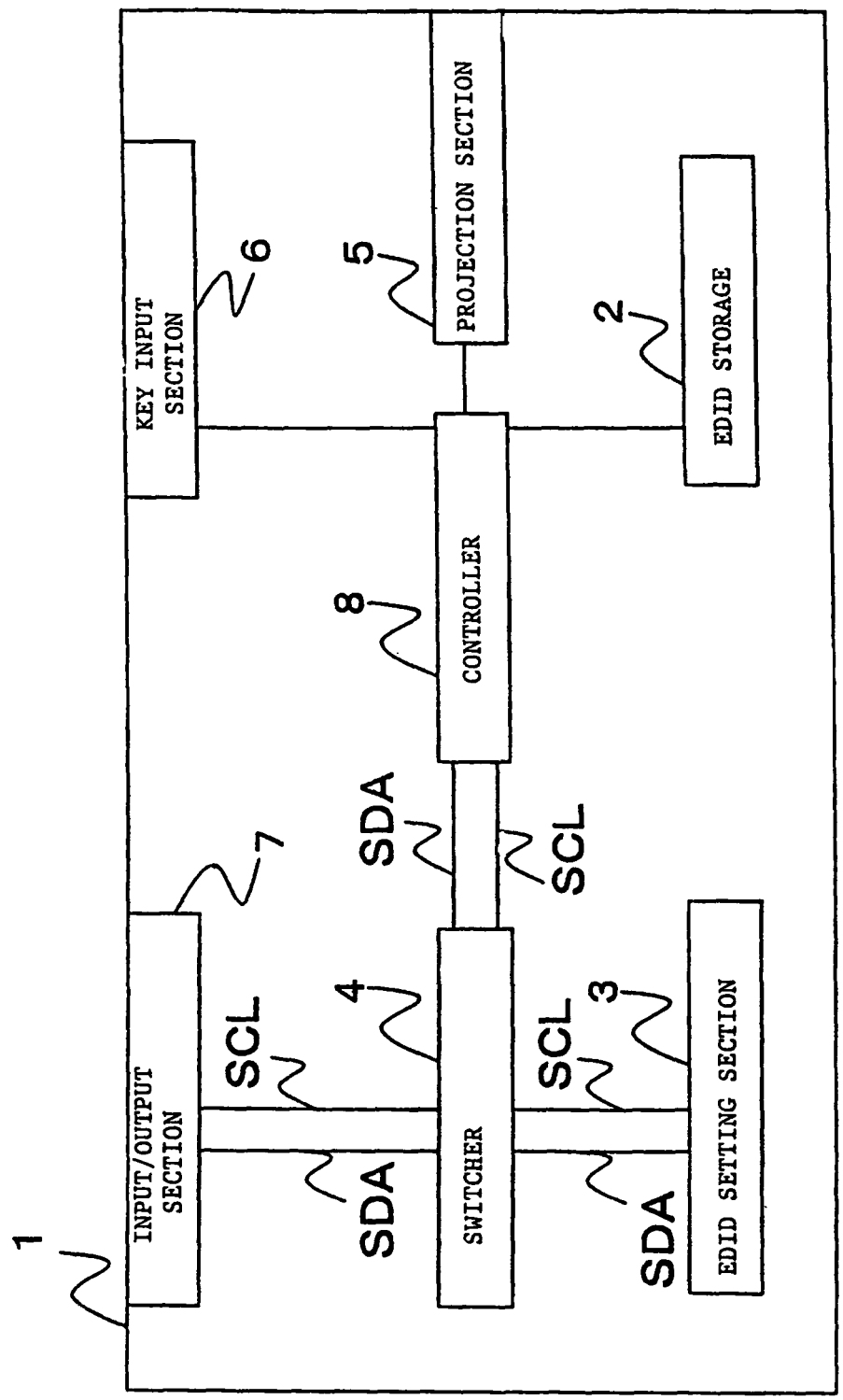
FIG. 2 is a block diagram of the projector shown in FIG. 1.

FIG. 3 is a flowchart of an operation sequence of projector 1 shown in FIG. 2.

Controller 8 receives a signal requesting the transmission of an image signal for a selection screen from key input section 6 (step 100), and sends an image signal representative of a selection screen to projecting section 5. Projecting section 5 projects the selection screen based on the image signal received from controller 8 onto the projection surface (step 101).

When controller 8 receives an aspect ratio indicating signal from key input section 6, controller 8 instructs switcher 4 to change the connection of EDID setting section 3 from input/output section 7 to controller 8 (step 102). Then, controller 8 reads the EDID which has the aspect ratio indicated by the aspect ratio indicating signal received from key input section 6, from EDID storage 2 (step 103). Controller 8 then sets the read EDID in EDID setting unit 3 (step 104). Controller 8 instructs switcher 4 to change the connection of EDID setting section 3 from controller 8 to input/output section 7 (step 105).

According to the present exemplary embodiment, as described above, in a display apparatus that is provided as projector 1, the EDID representative of the aspect ratio of the display of a computer as wide PC 10 are set as identification information, and an image based on an image signal from the computer is projected at the aspect ratio indicated by the identification information. Since the aspect ratio is not identified based on the image signal from the computer, but identified based on the identification information set in the display apparatus, the display apparatus can project a distortion-free image based on the image signal which may be either one of image signals having similar aspect ratios, e.g. 15:9, 16:9, 16:10, etc. The image displayed by the display apparatus is thus prevented from being distorted.

Operation of projector 1 in a specific example of usage of projector 1 will be described below.

Before a PC is connected to projector 1, the user checks the aspect ratio of the PC. The user controls projector 1 to display a screen for selecting an aspect ratio, and specifies, on the displayed screen, an item corresponding to the aspect ratio of the PC to be connected to projector 1.

When the user has specified the aspect ratio, controller 8 changes the connection of EDID setting section 3 from input/output section 7 to controller 8, acquires the EDID which corresponds to the specified aspect ratio from EDID storage 2, and sets the acquired EDID in EDID setting unit 3. Thereafter, controller 8 instructs switcher 4 to change the connection of EDID setting section 3 from controller 8 to input/output section 7, and controls projecting section 5 to display a message which shows that the EDID of the aspect ratio set by the user are properly set in the EDID setting section 3, on the projection surface.

After the message has been displayed, the user connects the PC to projector 1. When the PC is connected to projector 1, the PC acquires the EDID set in EDID setting section 3 in a plug-and-play session.

Based on the EDID acquired from projector 1, the PC recognizes the aspect ratio of projector 1. The PC has an image conversion table for a plurality of different aspect ratios. If a display apparatus having an aspect ratio different from the aspect ratio of the display of the PC is connected to the PC, then the PC refers to the image conversion table, and performs an image conversion process to convert its image signal aspect ratio into the aspect ratio of the display apparatus. In the present example, since the PC and projector 1 have the same aspect ratio, the PC does not perform the image conversion process and sends the image signal to projector 1.

In projector 1, input/output section 7 receives the image signal from the PC, and supplies the received image signal to controller 8. Controller 8 supplies the image signal from input/output section 7 to projecting section 5. At this time, controller 8 supplies the information about the aspect ratio corresponding to the EDID set in EDID setting section 3, together with the image signal, to projecting section 5.

Projecting section 5 comprises a video processing circuit, a light source, a liquid crystal panel for forming an image based on an image signal supplied from the video processing circuit, an illuminating optical system for illuminating the liquid crystal panel with light rays from the light source, and a projection lens for projecting an image formed by the liquid crystal panel. The video processing circuit generates an image signal to be supplied to the liquid crystal panel based on the image signal and the information about the aspect ratio supplied from controller 8, and the aspect ratio of an effective pixel area of the liquid crystal panel. For example, if the aspect ratio of the effective pixel area of the liquid crystal panel is 4:3 and the information about the aspect ratio supplied from controller 8 represents 16:9, then the video processing circuit generates an image signal having strip-like black areas corresponding to blanking periods above and below the image, based on the image signal supplied from controller 8. In this manner, the image based on the image signal from controller 8 is projected onto the projection surface at the aspect ratio corresponding to the EDID set in EDID setting section 3. The aspect ratio of the effective pixel area of the liquid crystal panel has been stored in the video processing circuit.

According to the operation described above, the user can freely set an aspect ratio within the range of EDID registered in projector 1. The user can set an aspect ratio for projector 1 depending on the aspect ratio of the PC. Projector 1 can project an image based on an image signal supplied from the PC at the same aspect ratio as the aspect ratio of the PC.

Projector 1 described above is illustrated as only an example of the present invention, and its structure and operation can be changed appropriately. For example, projector 1 may have a function for updating the information about the EDID stored in EDID storage 2. The updating function is provided by a program stored in the memory of projector 1 for registering EDID in, and deleting EDID from, EDID storage 2. When the user makes a certain input action through key input section 6, controller 8 executes the program stored in the memory. When the program is executed, the user can register and delete EDID.

The PC connected to projector 1 is not limited to a PC capable of operating in a plug-and-play mode, but may be a PC which does not have a plug-and-play function. Even if the PC connected to projector 1 does not have a plug-and-play function, projector 1 can project an image based on an image signal supplied from the PC at the same aspect ratio as the aspect ratio of the PC.

The present invention is applicable to other display devices than projectors, typified by liquid crystal panels, plasma display panels, etc.

This application is based upon and claims the benefit of priority from Japanese Patent Application No. 2007-193279 filed in Japan Patent Office on Jul. 25, 2007, the contents of which are hereby incorporated by reference.

While exemplary embodiments of the present invention have been described using specific terms, such description is for illustrates purposes only, and it is to be understood that changes and variations may be made without departing from the spirit or scope of the following claims.

The invention claimed is:

1. A display apparatus for receiving an image signal from a computer and projecting an image depending on the image signal onto a projection surface, said display apparatus comprising:
a setting section which sets identification information representative of an aspect ratio of a display of the computer;
a storage which stores a plurality of identification information representative of respective aspect ratios;
a controller which controls a setting of the identification information in said setting section;
an input/output section connected to said computer;
a switcher which selectively changes a connection of said setting section to one of said controller and said input/output section; and
a key input section which receives a signal input thereto,
wherein, when said controller detects a signal input to said key input section for specifying one of said plurality of identification information stored in said storage, said controller instructs said switcher to change the connection of said setting section from said input/output section to the controller, acquires the specified identification information from said storage, newly sets the acquired specified identification information in said setting section through said switcher, and thereafter instructs said switcher to change the connection of said setting section from the controller to said input/output section,
wherein said switcher selectively changes between a first state, in which a signal source is connected to a bus, and a second state, in which the signal source is separated from the bus, and
wherein the aspect ratio is identified based on the identification information set in the setting section independent of the image signal from the computer.

2. A display apparatus according to claim 1, wherein said controller selectively carries out a plug-and-play control mode, and when said input/output section is connected to the computer for reading the identification information set in said setting section in a plug-and-play session, the identification information set in said setting section is output to said computer.

3. A projector for receiving an image signal from a computer and projecting an image depending on the image signal, said projector comprising:
a setting section which sets identification information representative of an aspect ratio of a display of the computer;
a storage which stores a plurality of identification information representative of respective aspect ratios;
a controller which controls a setting of the identification information in said setting section;
an input/output section connected to said computer;
a switcher which selectively changes a connection of said setting section to one of said controller and said input/output section; and
a key input section which receives a signal input thereto,
wherein, when said controller detects a signal input to said key input section for specifying one of said plurality of identification information stored in said storage, said controller instructs said switcher to change the connection of said setting section from said input/output section to the controller, acquires the specified identification information from said storage, newly sets the acquired specified identification information in said setting section through said switcher, and thereafter instructs said switcher to change the connection of said setting section from the controller to said input/output section, wherein said switcher selectively changes between a first state, in which a signal source is connected to a bus, and a second state, in which the signal source is separated from the bus, and wherein the aspect ratio is identified based on the identification information set in the setting section independent of the image signal from the computer.

4. A projector according to claim 3, wherein said controller selectively carries out a plug-and-play control mode, and when said input/output section is connected to the computer for reading the identification information set in said setting section in a plug-and-play session, the identification information set in said setting section is output to said computer.

5. A display apparatus for projecting an image depending on an image signal, said display apparatus comprising:
- an input/output section for receiving the image signal from a computer;
- means operatively coupled to said input/output section, for setting identification information representative of an aspect ratio of a display of the computer;
- means for storing a plurality of identification information representative of respective aspect ratios;
- means for controlling a setting of the identification information in said means for setting;
- means for selectively changing a connection of said means for setting to one of said means for controlling and said input/output section; and
- a key input section which receives a signal input thereto, wherein, when said means for controlling detects a signal input to said key input section for specifying one of said plurality of identification information stored in said means for storing, said means for controlling instructs said means for selectively changing to change the connection of said means for setting from said input/output section to the means for controlling, acquires the specified identification information from said means for storing, newly sets the acquired specified identification information in said means for setting through said means for selectively changing, and thereafter instructs said means for selectively changing to change the connection of said means for setting from the means for controlling to said input/output section, wherein said means for selectively changing selectively changes between a first state, in which a signal source is connected to a bus, and a second state, in which the signal source is separated from the bus, and wherein the aspect ratio is identified based on the identification information set in the means operatively coupled to said input/output section, independent of the image signal from the computer.

6. A display apparatus according to claim 5, wherein said means for controlling selectively carries out a plug-and-play control mode, and when said input/output section is connected to the computer for reading the identification information set in said means for setting in a plug-and-play session, the identification information set in said means for setting is output to said computer.

7. A display apparatus according to claim 1, further comprising:
- a projecting section which projects an image depending on the image signal from said computer at an identified aspect ratio based on said identification information set in said setting section.

8. A display apparatus according to claim 1, wherein the bus employs a serial data line (SDA) and a serial clock line (SCL).

9. A display apparatus according to claim 1, wherein in the first state, the signal source reads data.

10. A display apparatus according to claim 1, wherein said bus comprises an I$^2$C (Inter Integrated Circuit) bus.

11. A display apparatus according to claim 1, wherein said setting section is connected to said controller via the bus that employs a serial data line (SDA) and a serial clock line (SCL).

12. A display apparatus according to claim 11, wherein said bus comprises an I$^2$C (Inter Integrated Circuit) bus.

13. A projector according to claim 3, wherein the bus employs a serial data line (SDA) and a serial clock line (SCL).

14. A display apparatus according to claim 5, wherein the bus employs a serial data line (SDA) and a serial clock line (SCL).

* * * * *